United States Patent
Cheng et al.

(10) Patent No.: US 12,177,649 B2
(45) Date of Patent: Dec. 24, 2024

(54) VIRTUAL REALITY PROVIDING DEVICE AND AUDIO PROCESSING METHOD

(71) Applicant: C-MEDIA ELECTRONICS INC., Taipei (TW)

(72) Inventors: Chi-Chen Cheng, Taipei (TW); Yi-Chen Ho, Taipei (TW)

(73) Assignee: C-MEDIA ELECTRONICS INC., Taipei (TW)

( * ) Notice: Subject to any disclaimer, the term of this patent is extended or adjusted under 35 U.S.C. 154(b) by 159 days.

(21) Appl. No.: 17/993,933

(22) Filed: Nov. 24, 2022

(65) Prior Publication Data

US 2023/0328473 A1 Oct. 12, 2023

(30) Foreign Application Priority Data

Apr. 8, 2022 (TW) ................................. 111113556

(51) Int. Cl.
| | |
|---|---|
| *H04S 7/00* | (2006.01) |
| *G06F 3/01* | (2006.01) |
| *G06T 7/55* | (2017.01) |
| *H04R 1/04* | (2006.01) |
| *H04R 5/027* | (2006.01) |

(52) U.S. Cl.
CPC .............. *H04S 7/303* (2013.01); *G06F 3/011* (2013.01); *G06T 7/55* (2017.01); *H04R 1/04* (2013.01); *H04R 5/027* (2013.01); *G06T 2207/30196* (2013.01); *H04S 2400/11* (2013.01); *H04S 2400/13* (2013.01); *H04S 2400/15* (2013.01)

(58) Field of Classification Search
CPC .. H04S 7/303; H04S 2400/11; H04S 2400/13; H04S 2400/15; G06T 7/55; G06T 2207/30196; G06F 3/011; H04R 1/04; H04R 5/027
See application file for complete search history.

(56) References Cited

U.S. PATENT DOCUMENTS

| | | | |
|---|---|---|---|
| 9,769,584 B1 | 9/2017 | Norris | |
| 10,979,806 B1* | 4/2021 | Johnson | ................. H04N 23/90 |
| 2022/0030375 A1 | 1/2022 | Falk et al. | |
| 2022/0382509 A1 | 12/2022 | Filos et al. | |

FOREIGN PATENT DOCUMENTS

| | | |
|---|---|---|
| CN | 113556501 A | 10/2021 |
| TW | 202134856 A | 9/2021 |

* cited by examiner

*Primary Examiner* — Andrew Sniezek
(74) *Attorney, Agent, or Firm* — Li & Cai Intellectual Property (USA) Office (57) ABSTRACT

A virtual reality providing device and an audio processing method are provided. The virtual reality providing device includes a casing, a first microphone, a controller, an audio controller, an image player, and an audio player. The first microphone is disposed at one side of the case to receive a first audio signal of a user. The audio controller is electrically connected to the first microphone and the controller. The controller obtains a first sound collection distance and a first sound collection angle based on a virtual sound collection position. The virtual sound collection position is different from a position of the first microphone. The controller adjusts the first audio signal based on the first sound collection distance and the first sound collection angle to generate an adjusted first audio signal, and the audio player plays the adjusted first audio signal.

19 Claims, 13 Drawing Sheets

VIRTUAL REALITY PROVIDING DEVICE AND AUDIO PROCESSING METHOD

CROSS-REFERENCE TO RELATED PATENT APPLICATION

This application claims the benefit of priority to Taiwan Patent Application No. 111113556, filed on Apr. 8, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a virtual reality providing device and an audio processing method, and more particularly to a virtual reality providing device and an audio processing method that provide different microphone sound fields.

BACKGROUND OF THE DISCLOSURE

Currently, conventional virtual reality providing devices mainly play recorded audio information, and cannot exhibit differences resulting from different types of microphones and hand gestures of singers.

Therefore, how to provide a virtual reality providing device and an audio processing method that include multiple microphone modules, so as to overcome the above-mentioned problems, has become one of the important issues to be solved in this industry.

SUMMARY OF THE DISCLOSURE

In response to the above-referenced technical inadequacies, the present disclosure provides a virtual reality providing device and an audio processing method.

In one aspect, the present disclosure provides a virtual reality providing device, which is adapted to be worn by a user. The virtual reality providing device includes a casing, a first microphone, a controller, an audio controller, an image player, and an audio player. The first microphone is disposed at one side of the casing to receive a first audio signal of the user. The controller is disposed in the casing. The audio controller is disposed in the casing. The audio controller is electrically connected to the first microphone and the controller. The image player is electrically connected to the controller. The audio player is electrically connected to the audio controller. The controller obtains a first sound collection distance and a first sound collection angle based on a virtual sound collection position. The virtual sound collection position is different from a position of the first microphone. The controller adjusts the first audio signal based on the first sound collection distance and the first sound collection angle to generate an adjusted first audio signal, and the audio player plays the adjusted first audio signal.

In another aspect, the present disclosure provides an audio processing method for virtual reality, which is adapted for a virtual reality providing device. The virtual reality providing device includes a first microphone and an audio player. The audio processing method includes: receiving a first audio signal of a user through the first microphone; calculating a first sound collection distance and a first sound collection angle based on a virtual sound collection position; adjusting the first audio signal to generate an adjusted first audio signal based on the first sound collection distance and the first sound collection angle; and playing the adjusted first audio signal through the audio player.

Therefore, the virtual reality providing device and the audio processing method provided by the present disclosure can effectively simulate sound fields of different microphones based on a hand image of the user or changes in the sound collection distance and the sound collection angle between a portable device and a mouth position of the user. The sound effect of adjusted audio signals is played in the virtual reality providing device.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the casing of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Figure 1:
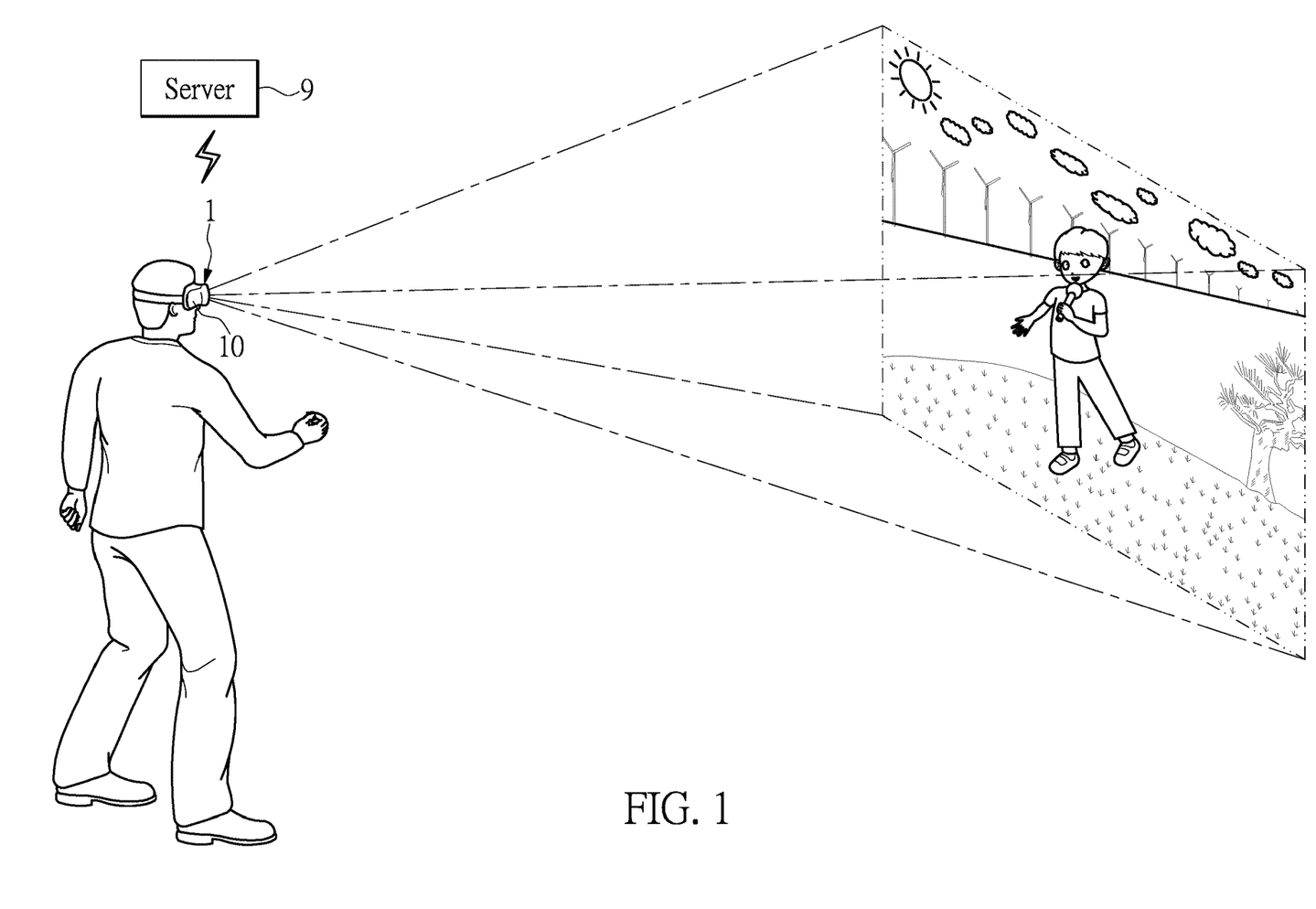
FIG. 1 is a schematic view of a virtual reality providing device according to a first embodiment of the present disclosure.
Figure 2:
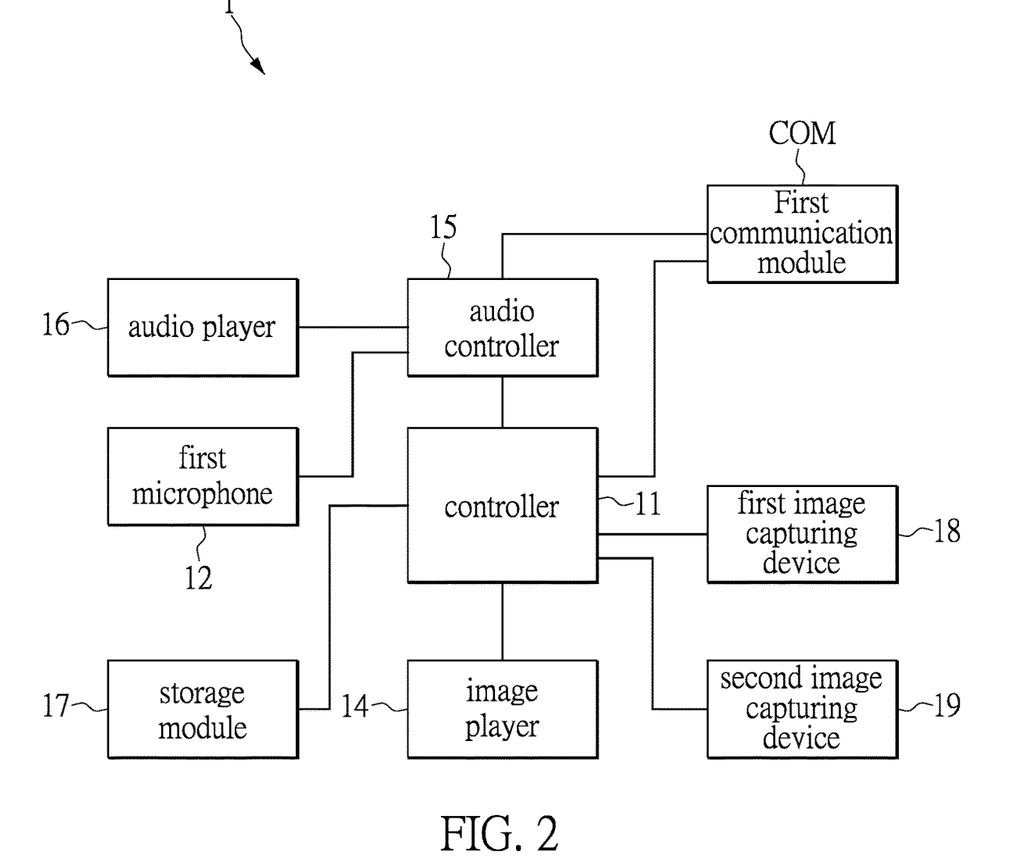
FIG. 2 is a functional block diagram of the virtual reality providing device according to the first embodiment of the present disclosure.

Reference is made to FIG. 1 and FIG. 2. FIG. 1 is a schematic view of a virtual reality providing device according to a first embodiment of the present disclosure. FIG. 2 is functional block diagram of the virtual reality providing device according to the first embodiment of the present disclosure;

In this embodiment, a virtual reality providing device 1 is provided to be connected to a server 9. The virtual reality providing device 1 is adapted to be worn by a user.

The virtual reality providing device 1 includes a casing 10, a controller 11, a first microphone 12, an image player 14, an audio controller 15, an audio player 16, a storage module 17, a first image capturing device 18, a second image capturing device 19, and a first communication module COM.

The first microphone 12 is disposed on the casing 10 to receive a first audio signal of the user. The first microphone 12 can continuously record a plurality of first audio signals of the user.

In this embodiment, a virtual sound collection position is generated by an image of a hand of the user, and the image is captured by the first image capturing device 18 and the second image capturing device 19.

The first image capturing device 18 is disposed on one side of the casing 10, and detects a first hand image of the hand of the user. The second image capturing device 19 is disposed on one side of the casing 10, and detects a second hand image of the hand of the user. The first hand image and the second hand image are images captured for a same part of a same hand of the user. In this way, depth information can be obtained through an algorithm for subsequent distance calculation.

In this embodiment, the first image capturing device 18 and the second image capturing device 19 are disposed adjacent to each other. In other words, the first image capturing device 18 and the second image capturing device 19 are arranged on the same side of the casing 10 and are arranged at positions suitable for obtaining the hand image. In addition, when the user wears the virtual reality providing device 1, a mouth position of the user can be obtained through estimated calculation. That is, a predetermined position of the mouth of the user can be obtained by wearing the virtual reality providing device 1.

In this embodiment, the virtual reality providing device 1 uses the first image capturing device 18 and the second image capturing device 19 to respectively capture a plurality of hand images of the user, so as to obtain a hand distance of the user.

The audio controller 15 is disposed in the casing 10. The audio controller 15 is electrically connected to the first microphone 12 and the controller 11. The first audio signals recorded by the first microphone 12 are transmitted to the audio controller 15 for processing.

The image player 14 is disposed in the casing 10. The image player 14 is electrically connected to the controller 11 for playing various images provided by the controller 11.

The controller 11 is electrically connected to the first image capturing device 18 and the second image capturing device 19. The controller 11 receives the first hand image and the second hand image captured by the first image information capturing device 18 and the second image information capturing device 19. The first hand image and the second hand image are different images of the same part of the hand the user.

In this embodiment, the controller 11 calculates a first sound collection distance and a first sound collection angle between the mouth and the hand of the user based on the first hand image, the second hand image, and the mouth position of the user. The first sound collection distance and the first sound collection angle are not fixed. That is, a distance between the mouth and the hand of the user can be adjusted based on actions of the user.

The audio player 16 is electrically connected to the audio controller 15. The storage module 17 is electrically connected to the controller 11. The storage module 17 stores a plurality of microphone audio modules, and provides various microphone audio recording configurations.

Figure 3A:
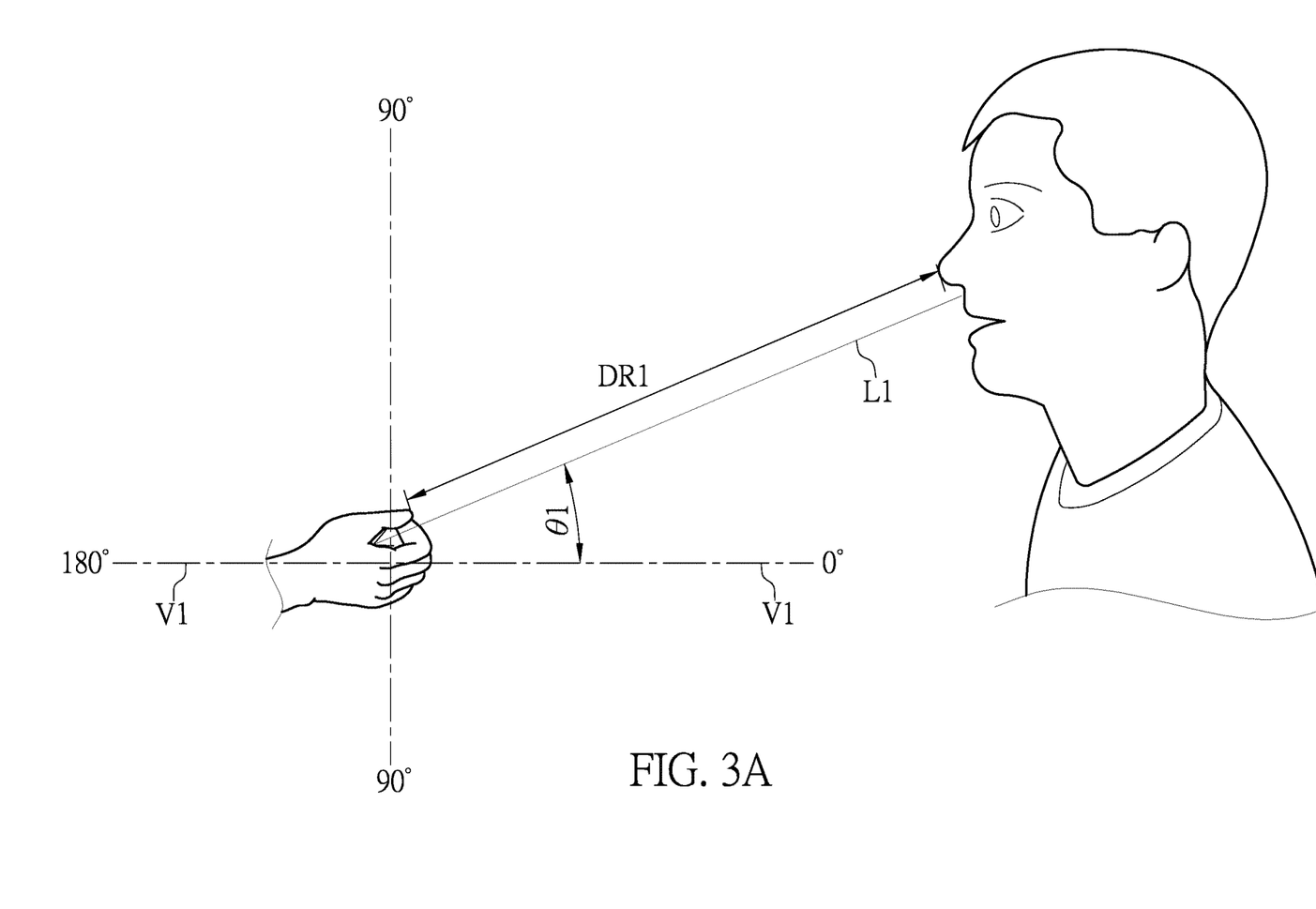
FIG. 3A is a schematic view of a first sound collection distance and a first sound collection angle according to the first embodiment of the present disclosure.
Figure 4:
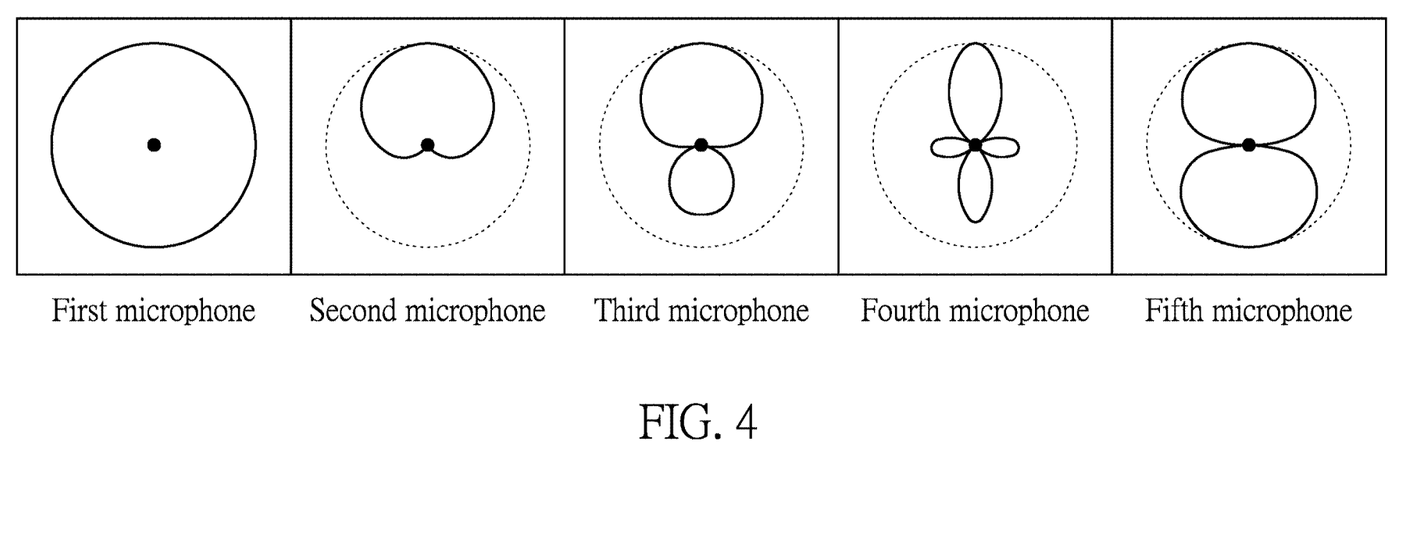
FIG. 4 is a schematic view showing a plurality of microphone audio modules stored in a storage module according to the present disclosure.

Reference is made to FIG. 3A and FIG. 4. FIG. 3A is a schematic view of a first sound collection distance and a first sound collection angle according to the first embodiment of the present disclosure. FIG. 4 is a schematic view showing a plurality of microphone audio modules stored in the storage module of the present disclosure.

In this embodiment, the storage module 17 stores, for example, five microphone audio modules. The user can make a selection through a setting page of the virtual reality providing apparatus 1. For example, the virtual reality providing device 1 provides a plurality of buttons in a virtual scene to be selected. The microphone audio recording configurations of the microphone audio modules are different from one another. A sound field of some microphone audio modules is cardioid, while the sound field of some microphone audio modules is gun-shaped.

The microphone audio module can simulate different sound fields of a dynamic microphone, a condenser microphone, or an electret microphone, so as to obtain a polar diagram, a frequency response of various microphone audio modules, or a sensitivity of the microphone.

In this embodiment, characteristic parameters of each microphone audio module can be stored in the storage module 17 in the form of a table, and the audio controller 15 can use a table look-up method to adjust the audio signal.

The image player 14 displays a microphone image on the hand image of the user through the virtual reality providing device 1 based on the hand image and the first sound collection distance. The microphone image corresponds to one of the microphone audio modules in the storage module 17.

The audio controller 15 adjusts the first audio signal based on a first sound collection distance DR1 and a first sound collection angle θ1 on a connection line L1 between the mouth and the hand image of the user, so as to generate an adjusted first audio signal. The audio player 16 plays the adjusted first audio signal. That is, in FIG. 3A, the distance between the mouth of the user and the first hand image and the second hand image is calculated to adjust the first audio signal. For example, when the virtual sound collection position is farther away from the mouth of the user, a gain of the first audio signal is adjusted to be smaller. When the virtual sound collection position is closer to the mouth of the user, the gain of the first audio signal is adjusted to be larger.

The virtual reality providing device 1 further includes the first communication module COM. The first communication module COM is electrically connected to the audio controller 15 and the image player 14. The virtual reality providing device 1 can be connected to the server 9 or a mobile device (not shown) through the first communication module COM, so as to use the server 9 or the mobile device (not shown) for display or calculation purposes.

In this embodiment, the hand image is an image of a clenched fist or an image of the hand holding an object.

When the audio player 16 plays the adjusted first audio signal, the virtual reality providing device 1 plays a first virtual reality image, and a scoring program of the virtual reality providing device 1 can provide a score based on the adjusted first audio signal.

The controller 11, the audio controller 15 and the image player 14 can be a digital signal processor (DSP), a central processing unit (CPU), an application-specific integrated circuit (ASIC), or a graphics processing unit (GPU).

The storage module 17 is a flash memory, a read-only memory, a programmable read-only memory, an electrically erasable read-only memory, an erasable programmable read-only memory, or an electrically erasable programmable read-only memory.

The first communication module COM includes a wired communication unit (not shown) and a wireless communication unit (not shown). The wired communication unit (not shown) can also be independently disposed, so as to be communicatively connected with the server 9 and receive a control signal of the server 9 or data in a database of the server 9. When the first communication module COM is the wireless communication unit, the first communication module COM can be a WI-FI® communication unit, a BLUETOOTH® communication unit, a ZIGBEE® communication unit, a LoRa communication unit, a Sigfox communication unit or an NB-IoT communication unit.

Second Embodiment

Figure 3B:
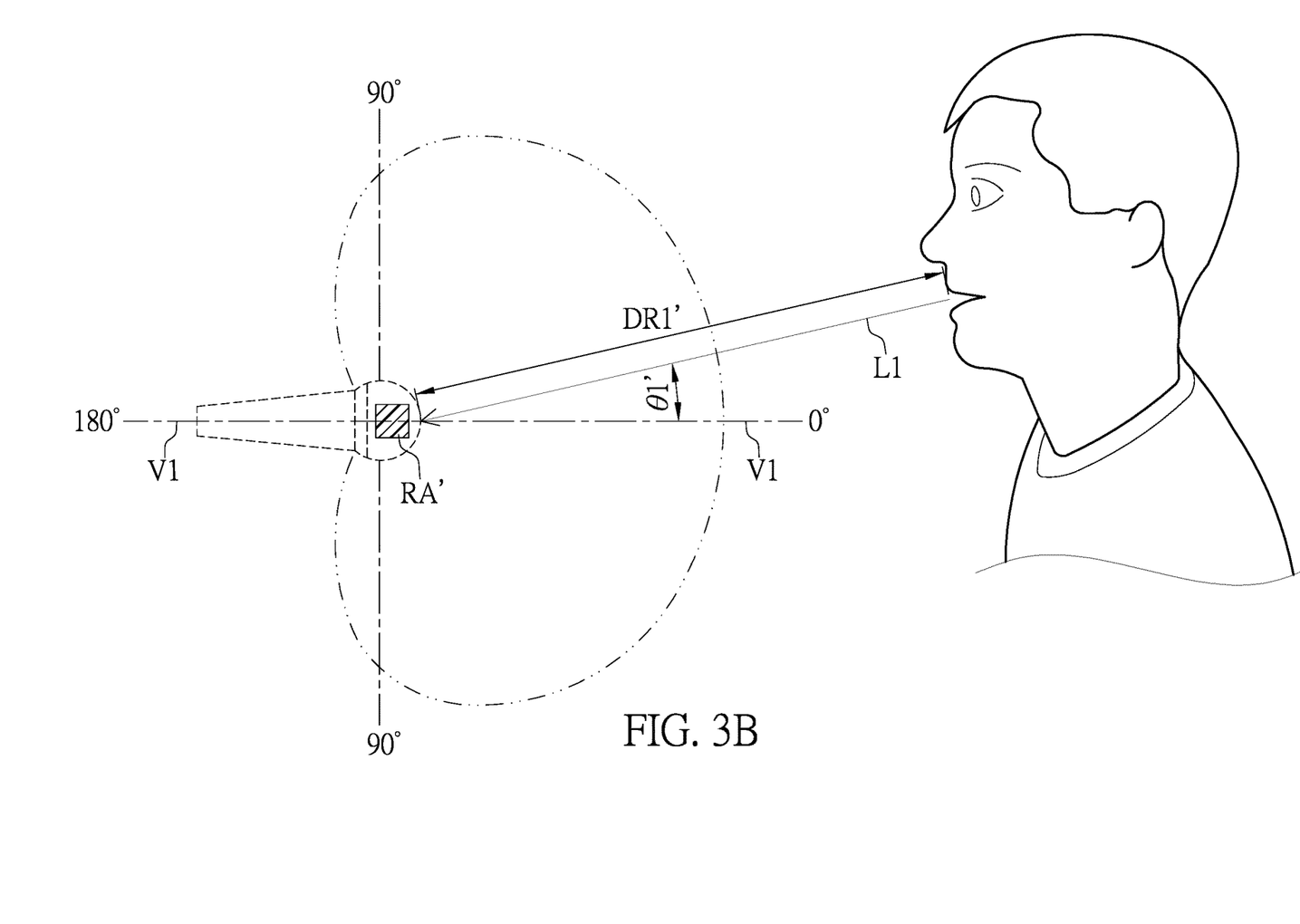
FIG. 3B is a schematic view of a first sound collection distance and a first sound collection angle according to a second embodiment of the present disclosure.

In this embodiment, the virtual reality providing device 1 of the first embodiment is also used to adjust the audio signal. As such, the structure and functions of the virtual reality providing device 1 are not reiterated herein.

Referring to FIG. 3B, in this embodiment, the virtual sound collection position is obtained based on a microphone image displayed in the virtual reality providing device 1.

Therefore, the controller 11 can calculate a first sound collection distance DR1' and a first sound collection angle θ1' between a sound collection area RA' of the microphone image in the virtual reality providing device 1 and the mouth position of the user in reality based on the microphone image displayed in the virtual reality providing device 1. Then, the controller 21 provides the first sound collection distance DR1' and the first sound collection angle θ1' to the audio controller 15, so as to adjust the first audio signal.

The audio controller 15 adjusts the first audio signal based on the first sound collection distance DR1' and the first sound collection angle θ1' between the sound collection area RA' of the microphone image and the mouth position of the user in reality. The first sound collection distance DR1' is can be varied, and the first sound collection angle θ1' can also be varied. The first sound collection angle θ1' is defined between a vertical axis V1 passing through the sound collection area RA' and the connection line L1 connecting the mouth and the sound collection area RA'. That is, in FIG. 3B, the image player adjusts the first audio signal based on the first sound collection distance DR1' and the first sound collection angle θ1' of the microphone image in the virtual reality providing device 1.

Third Embodiment

Figure 3C:
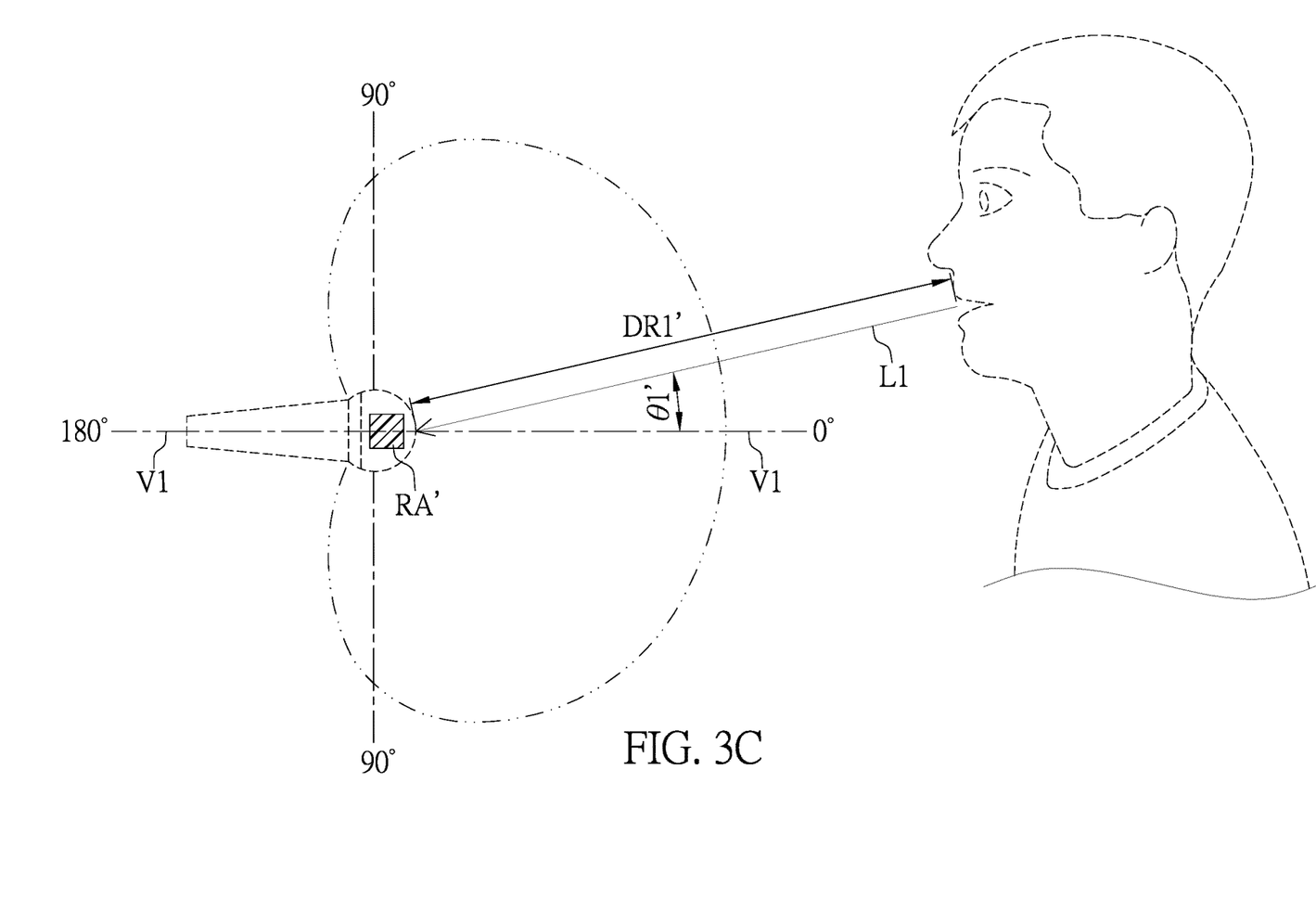
FIG. 3C is a schematic view of a first sound collection distance and a first sound collection angle according to a third embodiment of the present disclosure.

Reference is made to FIG. 3C. In this embodiment, the virtual reality providing device 1 of the first embodiment is also used to adjust the audio signal. As such, the structure and functions of the virtual reality providing device 1 are not reiterated herein.

In this embodiment, the virtual sound collection position is obtained based on the microphone image displayed in the virtual reality providing device 1. In addition, the mouth position of the user is obtained from a virtual body of the user in the virtual environment.

The controller 11 can calculate the first sound collection distance DR1' and the first sound collection angle θ1' between the sound collection area RA' of the microphone image in the virtual reality providing device 1 and the mouth position of the user in virtual reality based on the microphone image displayed in the virtual reality providing device 1 and the mouth position of the virtual body of the user in the virtual environment of the virtual reality providing device 1.

Then, the controller 11 provides the first sound collection distance DR1' and the first sound collection angle θ1' to the audio controller 15, so as to adjust the first audio signal. The human body is represented by dotted lines, and represents the virtual body of the user in the virtual environment of the virtual reality providing device 1.

Fourth Embodiment

Figure 5:
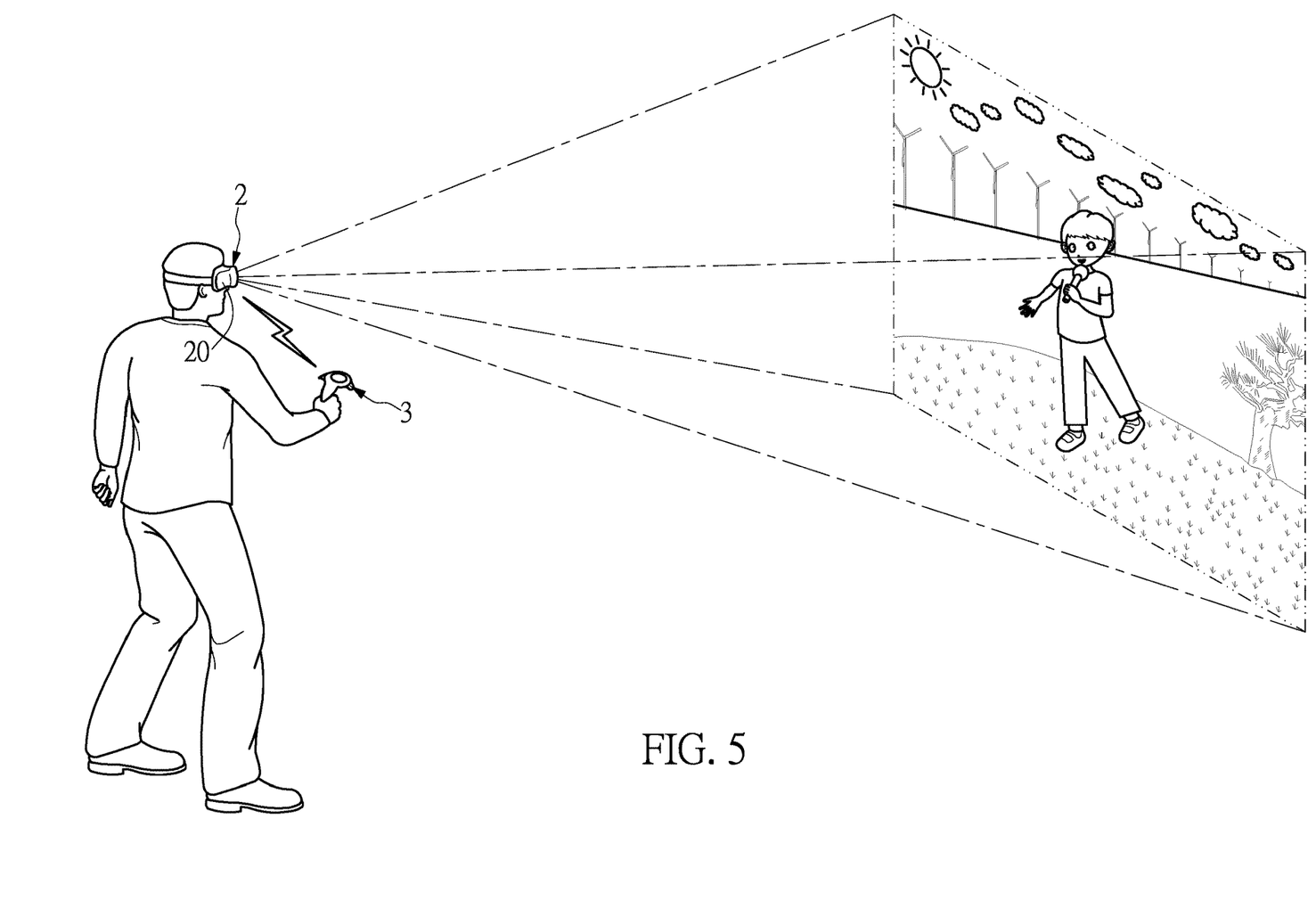
FIG. 5 is a schematic view of a virtual reality providing device according to a fourth embodiment of the present disclosure.
Figure 6:
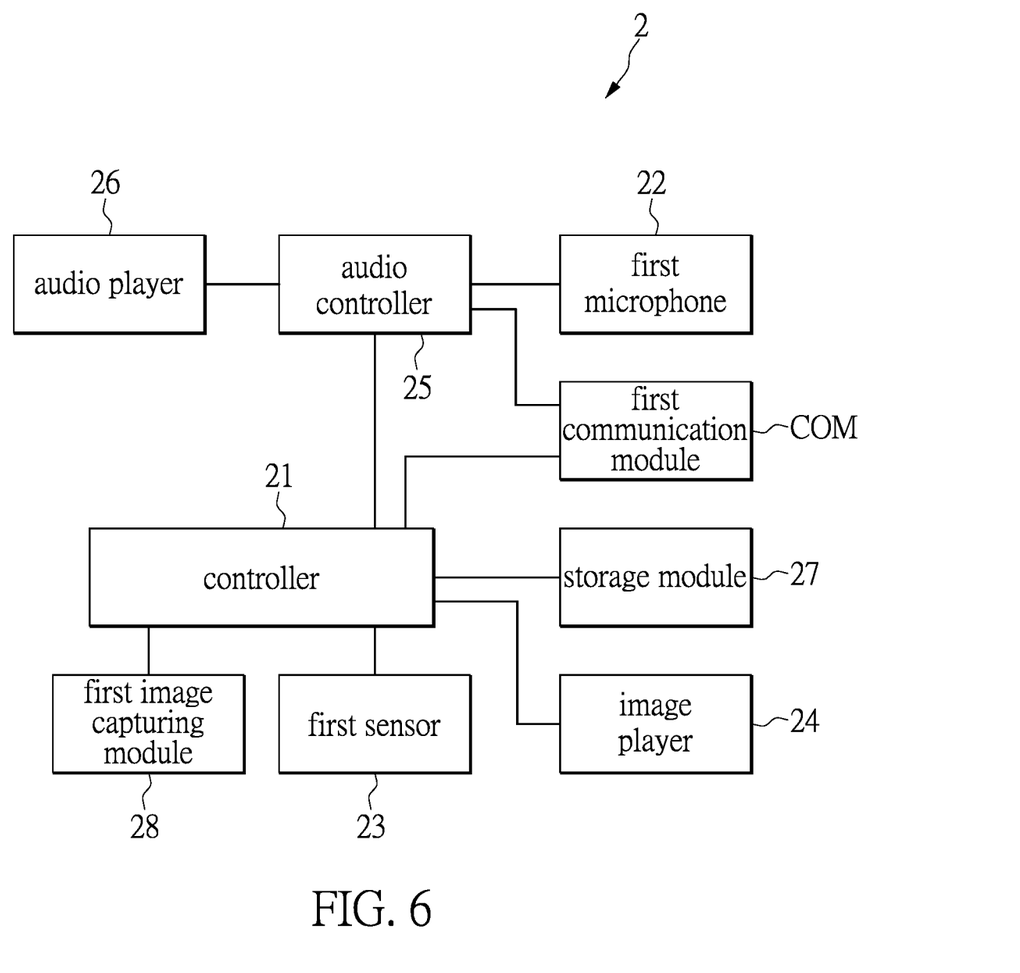
FIG. 6 is a functional block diagram of the virtual reality providing device according to the fourth embodiment of the present disclosure.
Figure 7:
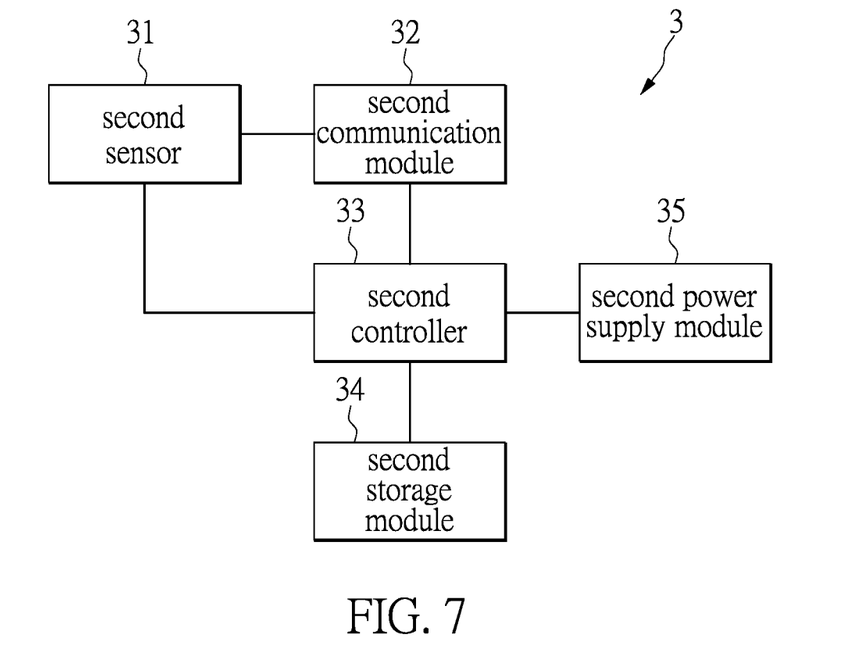
FIG. 7 is a functional block diagram of a portable device according to the fourth embodiment of the present disclosure.
Figure 8A:
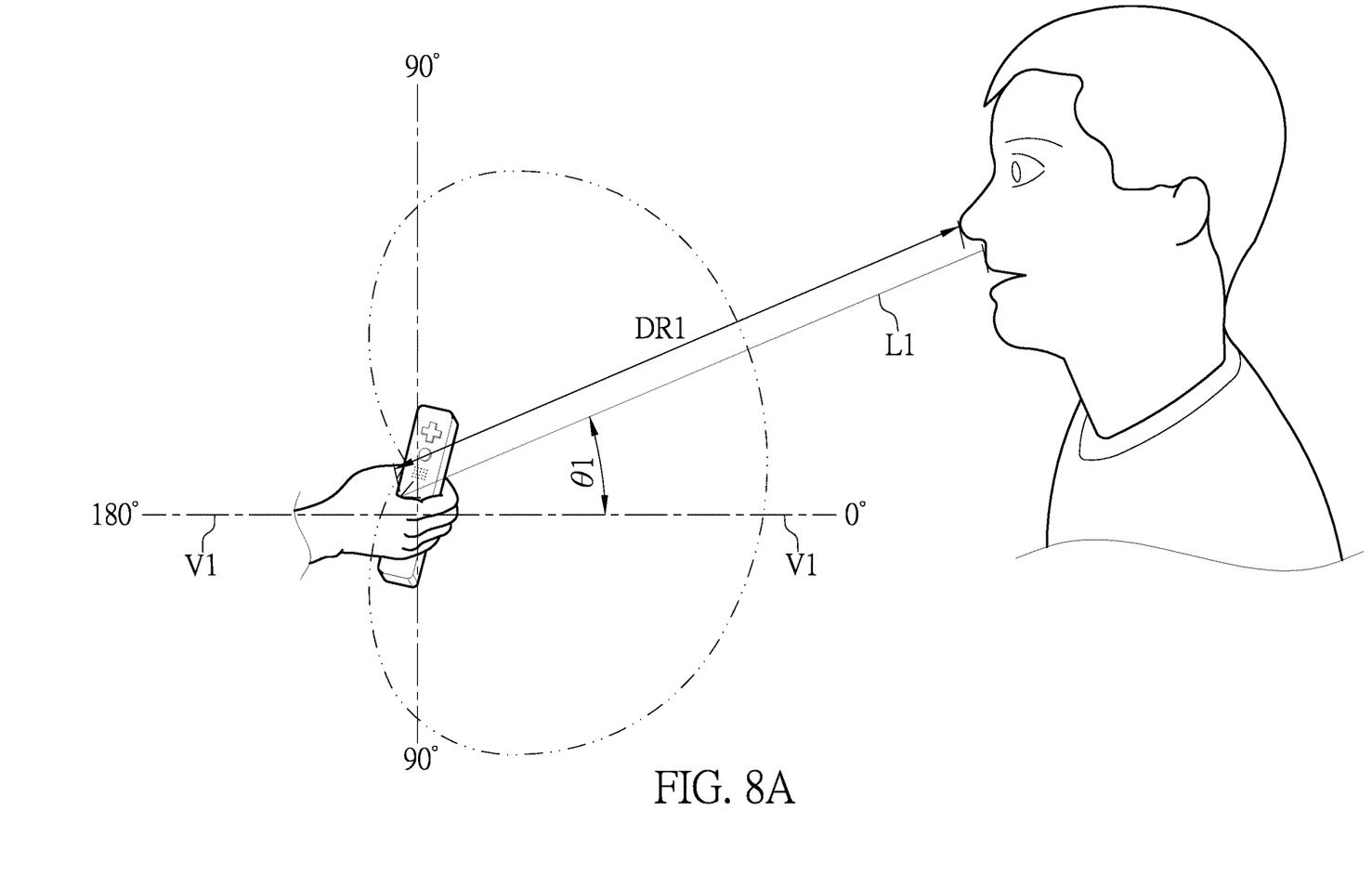
FIG. 8A is a schematic view of a first sound collection distance and a first sound collection angle according to the fourth embodiment of the present disclosure.

Reference is made to FIG. 5, FIG. 6, FIG. 7 and FIG. 8A. FIG. 5 is a schematic view of a virtual reality providing device according to a fourth embodiment of the present disclosure. FIG. 6 is a functional block diagram of a virtual reality providing device according to the fourth embodiment of the present disclosure. FIG. 7 is a functional block diagram of a portable device according to the fourth embodiment of the present disclosure. FIG. 8A is a schematic view of a first sound collection distance and a first sound collection angle according to a fourth embodiment of the present disclosure.

In this embodiment, the virtual sound collection position is obtained by a portable device 3.

A virtual reality providing device 2 is adapted for being worn by a user. The virtual reality providing device 2 includes a casing 20, a controller 21, a first microphone 22, a first sensor 23, an image player 24, an audio controller 25, an audio player 26, a storage module 27 and a first communication module COM.

The controller 21 is electrically connected to the audio controller 25, the first communication module COM, the first sensor 23, the image information player 24, and the storage module 27. The audio controller 25 is electrically connected to the audio player 26, the first microphone 22, the controller 21 and the first communication module COM.

The portable device 3 includes a second sensor 31 and a second communication module 32. The second sensor 31 is electrically connected to the second communication module 32. In this embodiment, the portable device 3 can be a handheld device, a watch-type wearable electronic device, or a smart phone.

The portable device 3 further includes a second controller 33, a second storage module 34 and a second power supply module 35. The second controller 33 is electrically connected to the second storage module 34, the second power supply module 35, the second sensor 31 and the second communication module 32.

The first microphone 22 is disposed at one side of the casing 20. The first microphone 22 receives a first audio signal of the user.

The first sensor 23 is disposed in the casing 20, and is electrically connected to the controller 21.

The controller 21 generates a relative spatial relationship based on transmission signals between the first sensor 23 and the second sensor 31 of the portable device 3. The controller 21 transmits the relative spatial relationship between the first sensor 23 and the second sensor 31 to the audio controller 25. The relative spatial relationship between the first sensor 23 and the second sensor 31 can be, for example, a distance between the first sensor 23 and the second sensor 31 and an included angle relative to a reference line (which can be calculated based on signal strength of the two sensors).

That is, the controller 21 is connected to the second sensor 31 through the first communication module COM and the second communication module 32, so as to determine the relative spatial relationship between the first sensor 23 and the second sensor 31.

Referring to FIG. 8A, the virtual sound collection position is obtained based on the position of the second sensor 31 of the portable device 3. That is, the controller 21 can generate a first sound collection distance DR1 and a first sound collection angle θ1 based on the relative spatial relationship between the first sensor 23 and the second sensor 31 (i.e., the distance between the first sensor 23 and the second sensor 31 and their relative position). The controller 21 further provides the first sound collection distance DR1 and the first sound collection angle θ1 to the audio controller 25. The audio controller 25 adjusts the first audio signal based on the first sound collection distance DR1 and the first sound collection angle θ1, so as to generate an adjusted first audio signal. The first sound collection distance DR1 can be varied, and the first sound collection angle θ1 can also be varied. The audio player 26 plays the adjusted first audio signal. In this embodiment, the relative spatial relationship between the first sensor 23 and the second sensor 31 can be calculated by using signal strengths of the first sensor 23 and the second sensor 31, or by using triangulation algorithms to perform calculations.

The controller 21 provides the relative spatial relationship between the first sensor 23 and the second sensor 31 (the first sound collection distance DR1 and the first sound collection angle θ1) to the image player 24, so that a microphone image is displayed on the portable device 3 in the virtual reality providing device 2. In this embodiment, the portable device 3 can be a handheld electronic device or a watch-type electronic device.

Referring to FIG. 4, the storage module 27 stores a plurality of microphone audio modules. In this embodiment, the storage module 27 stores, for example, five microphone audio modules. The user can make a selection through a setting page of the virtual reality providing device 2. The microphone audio recording configurations of the microphone audio modules are different from one another. A sound field of some microphone audio modules is cardioid, while the sound field of some microphone audio modules is gun-shaped.

The microphone audio module can simulate different sound fields of a dynamic microphone, a condenser microphone, or an electret microphone, so as to obtain a polar diagram, a frequency response of various microphone audio modules, or a sensitivity of the microphone.

In this embodiment, the microphone image corresponds to one of the microphone audio modules in the storage module 27.

Next, the audio player 25 plays the adjusted first audio signal.

The first communication module COM is electrically connected to the audio controller 25 and the image player 24. The virtual reality providing device 2 can be connected to a server 9 or a mobile device (not shown) through the first communication module COM, so as to use the server 9 or the mobile device (not shown) for display or calculation purposes.

When the audio player 25 plays the adjusted first audio signal, the virtual reality providing device 2 plays a first virtual reality image, and a scoring program of the virtual reality providing device 2 can provide a score according to the adjusted first audio signal. In this embodiment, the virtual reality providing device 2 further includes a first image capturing module 28 electrically connected to the controller 21.

The controller 21, the audio controller 25 and the image player 24 can be a digital signal processor (DSP), a central processing unit (CPU), an application-specific integrated circuit (ASIC), or a graphics processing unit (GPU).

The storage module 27 is a flash memory, a read-only memory, a programmable read-only memory, an electrically erasable read-only memory, an erasable programmable read-only memory, or an electrically erasable programmable read-only memory.

The first communication module COM and the second communication module 32 each include a wired communication unit (not shown) and a wireless communication unit (not shown). The wired communication unit (not shown) can also be independently disposed, so as to be communicatively connected with the server 9 and receive a control signal of the server 9 or data in a database of the server 9. When the first communication module COM and the second communication module 32 are the wireless communication units, the first communication module COM and the second communication module 32 can be a WI-FI® communication unit, a BLUETOOTH® communication unit, a ZIGBEE® communication unit, a LoRa communication unit, a Sigfox communication unit or an NB-IoT communication unit.

Fifth Embodiment

In this embodiment, the virtual reality providing device 2 of the fourth embodiment is also used to adjust the audio signal. As such, the structures and functions of the virtual reality providing device 2 and the portable device 3 are not reiterated herein.

Figure 8B:
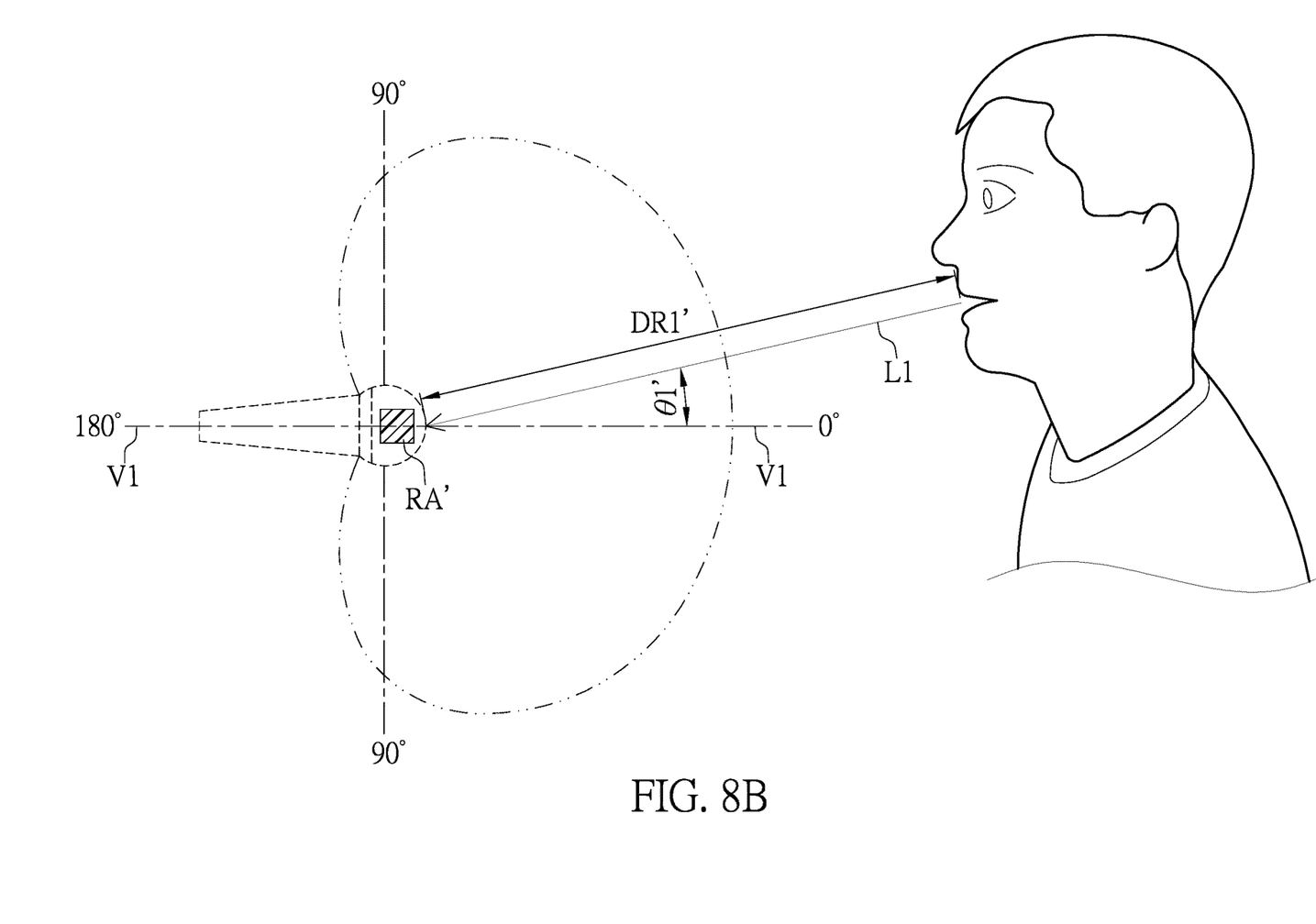
FIG. 8B is a schematic view of a first sound collection distance and a first sound collection angle according to a fifth embodiment of the present disclosure.

Referring to FIG. 8B, in this embodiment, the virtual sound collection position is obtained based on the microphone image displayed in the virtual reality providing device 2. The microphone image in the virtual reality providing device 2 is displayed based on the virtual sound collection position (i.e., the position of the second sensor 31 of the portable device 3).

Therefore, the controller 21 can calculate a first sound collection distance DR1' and a first sound collection angle θ1' between a sound collection area RA' of the microphone image in the virtual reality providing device 2 and the mouth position of the user in reality based on the microphone image displayed in the virtual reality providing device 2. Then, the controller 21 provides the first sound collection distance DR1' and the first sound collection angle θ1' to the audio controller 25, so as to adjust the first audio signal.

The audio controller 25 adjusts the first audio signal based on the first sound collection distance DR1' and the first sound collection angle θ1' between the sound collection area RA' in the microphone image and the mouth position of the user in reality. The first sound collection distance DR1' is not fixed, and the first sound collection angle θ1' is also not fixed. The first sound collection angle θ1' is defined between a vertical axis V1 passing through the sound collection area RA' and a connection line L1 connecting the mouth and the sound collection area RA'. That is, in FIG. 3B, the first audio signal is adjusted based on the first sound collection distance DR1' and the first sound collection angle θ1' of the microphone image in the virtual reality providing device 2.

The first sensor 23 and the second sensor 31 can be gyroscope sensors, acceleration sensors or a combination thereof.

Sixth Embodiment

Figure 8C:
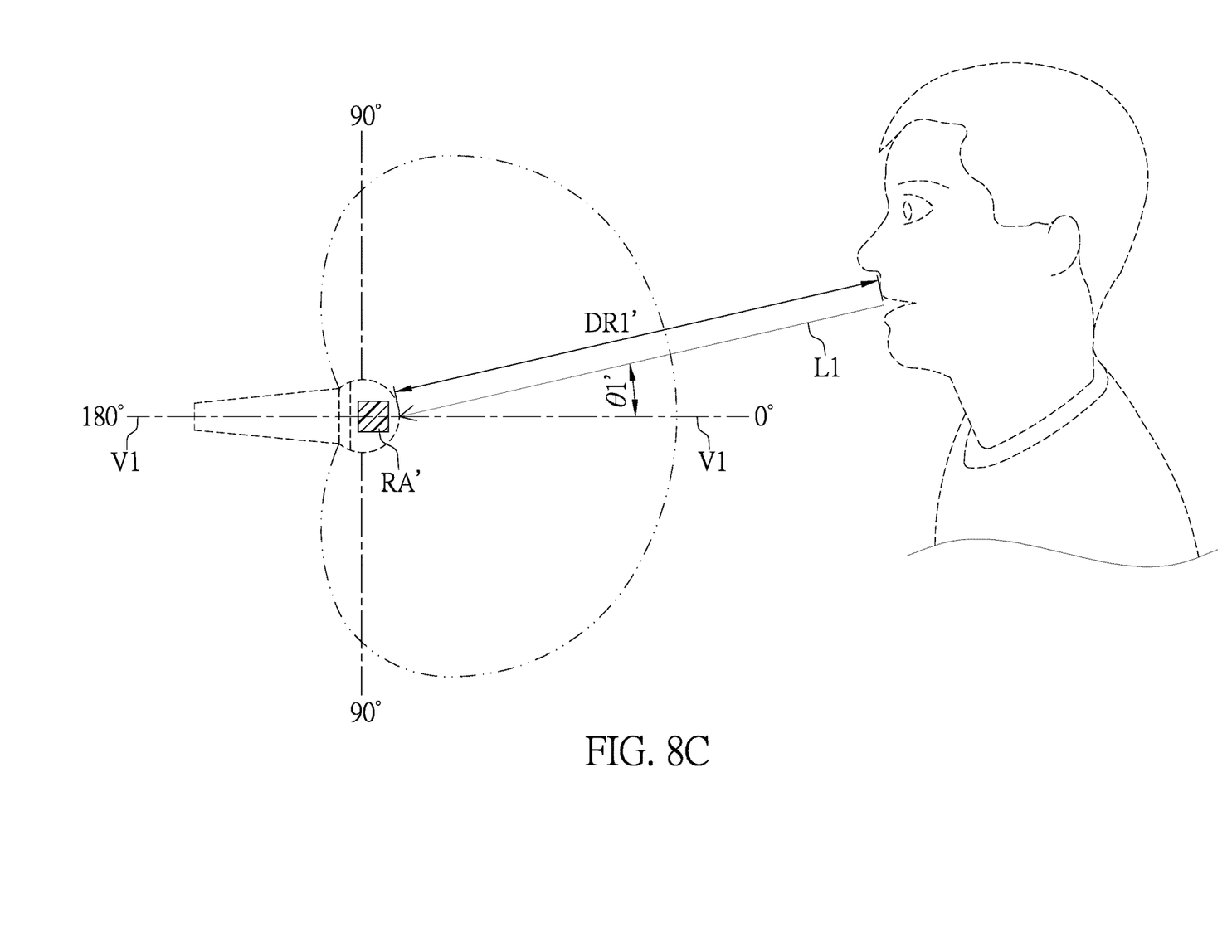
FIG. 8C is a schematic view of a first sound collection distance and a first sound collection angle according to a sixth embodiment of the present disclosure.

Referring to FIG. 8C, in this embodiment, the virtual reality providing device 2 of the fourth embodiment is also used to adjust the audio signal. As such, the structures and functions of the virtual reality providing device 2 and the portable device 3 are not reiterated herein.

In this embodiment, the virtual sound collection position is obtained based on the microphone image displayed in the virtual reality providing device 2.

The controller 21 can calculate the first sound collection distance DR1' and the first sound collection angle θ1' between the sound collection area RA' of the microphone image in the virtual reality providing device 2 and the mouth position of the user in virtual reality based on the microphone image displayed in the virtual reality providing device 2 and the mouth position of the virtual body of the user in the virtual reality providing device 2.

Then, the controller 21 provides the first sound collection distance DR1' and the first sound collection angle θ1' to the audio controller 25, so as to adjust the first audio signal. The human body is represented by dotted lines, and represents the virtual body of the user in the virtual reality providing device 2.

Seventh Embodiment

Figure 9:
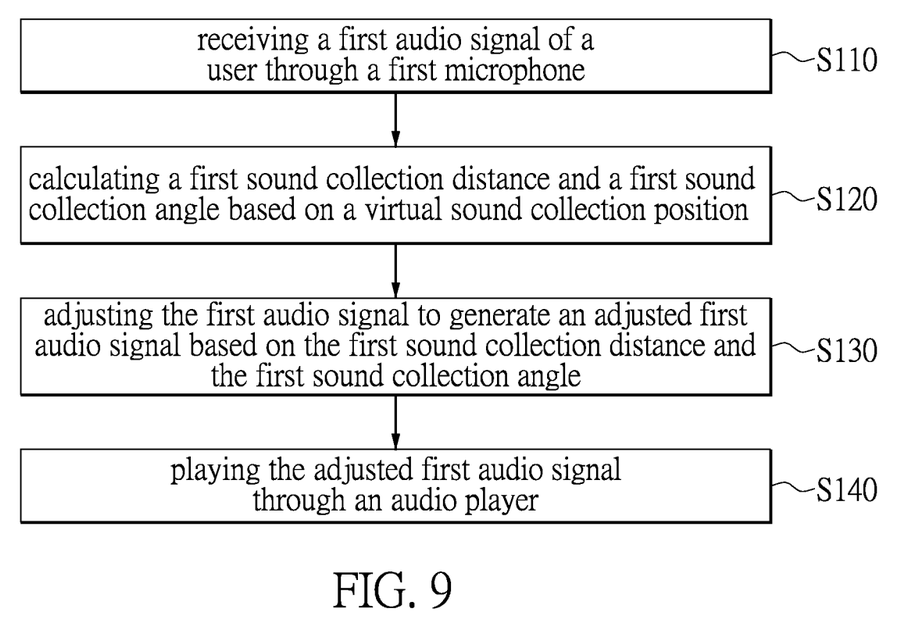
FIG. 9 is a flowchart of an audio processing method according to a seventh embodiment of the present disclosure.

Referring to FIG. 9, FIG. 9 is a flowchart of an audio processing method according to a seventh embodiment of the present disclosure.

The audio processing method of this embodiment is adapted for the virtual reality providing device 1 of the first embodiment, the second embodiment, and the third embodiment, and the virtual reality providing device 2 of the fourth embodiment, the fifth embodiment, and the sixth embodiment.

In this embodiment, the audio processing method for virtual reality includes steps as follows.

Step S110: receiving a first audio signal of a user through a first microphone.

Step S120: calculating a first sound collection distance and a first sound collection angle based on a virtual sound collection position.

Step S130: adjusting the first audio signal to generate an adjusted first audio signal based on the first sound collection distance and the first sound collection angle.

Step S140: playing the adjusted first audio signal through an audio player.

The audio processing method in this embodiment is adapted to the virtual reality providing devices of the first to sixth embodiments. When the audio player plays the adjusted first audio signal, the virtual reality providing device 1 plays a virtual reality image, and a scoring program of the virtual reality providing devices 1 and 2 provides a score based on the adjusted first audio signal.

Beneficial Effects of the Embodiments

In conclusion, the virtual reality providing device and the audio processing method provided by the present disclosure can effectively simulate the sound fields of different microphones based on the hand image of the user or the changes in the sound collection distance and the sound collection angle between the portable device and the mouth position of the user. The sound effect of the adjusted audio signals is played in the virtual reality providing device.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A virtual reality providing device, which is adapted to be worn by a user, the virtual reality providing device comprising:
a casing;
a first microphone being disposed at one side of the casing to receive a first audio signal of the user;
a controller being disposed in the casing;
an audio controller being disposed in the casing, wherein the audio controller is electrically connected to the first microphone and the controller;
an image player being electrically connected to the controller; and
an audio player being electrically connected to the audio controller;
wherein the controller obtains a first sound collection distance and a first sound collection angle based on a virtual sound collection position, and the virtual sound collection position is different from a position of the first microphone;
wherein the controller adjusts the first audio signal based on the first sound collection distance and the first sound collection angle to generate an adjusted first audio signal, and the audio player plays the adjusted first audio signal.

2. The virtual reality providing device according to claim 1, wherein the virtual sound collection position is obtained based on a first hand image and a second hand image of the user.

3. The virtual reality providing device according to claim 1, wherein the controller displays a microphone image in the virtual reality providing device, the controller obtains the virtual sound collection position based on the microphone image, the controller generates the first sound collection distance and the first sound collection angle based on the virtual sound collection position and a mouth position of the user, and the controller generates the adjusted first audio signal based on the first sound collection distance, the first sound collection angle, and the microphone image.

4. The virtual reality providing device according to claim 3, wherein the mouth position of the user is a mouth position of the user in reality.

5. The virtual reality providing device according to claim 3, wherein the mouth position of the user is a mouth position of the user in the virtual reality providing device.

6. The virtual reality providing device according to claim 1, wherein the virtual sound collection position is obtained based on a portable device.

7. The virtual reality providing device according to claim 1, wherein the controller displays a microphone image in the virtual reality providing device based on a position of the portable device, and the controller obtains the virtual sound collection position based on the microphone image of the virtual reality providing device, and generates the first sound collection distance and the first sound collection angle based on the virtual sound collection position and a mouth position of the user; wherein the controller generates the adjusted first audio signal based on the first sound collection distance, the first sound collection angle, and the microphone image.

8. The virtual reality providing device according to claim 7, wherein the mouth position of the user is a mouth position of the user in reality.

9. The virtual reality providing device according to claim 7, wherein the mouth position of the user is a mouth position of the user in the virtual reality providing device.

10. The virtual reality providing device according to claim 1, further comprising a storage module electrically connected to the audio controller and the image player, wherein the storage module stores microphone audio modules.

11. An audio processing method for virtual reality, which is adapted for a virtual reality providing device that includes a first microphone and an audio player, the audio processing method comprising:
receiving a first audio signal of a user through the first microphone;
calculating a first sound collection distance and a first sound collection angle based on a virtual sound collection position;
adjusting the first audio signal to generate an adjusted first audio signal based on the first sound collection distance and the first sound collection angle; and
playing the adjusted first audio signal through the audio player.

12. The audio processing method according to claim 11, wherein the virtual sound collection position is obtained based on a relative spatial relationship between a hand and a mouth position of the user.

13. The audio processing method according to claim 11, wherein the first sound collection distance and the first sound collection angle are at least determined based on the virtual sound collection position and a mouth position of the user, a microphone image is displayed in the virtual reality providing device based on the virtual sound collection position of the user, and the adjusted first audio signal is determined based on the first sound collection distance, the first sound collection angle, and the microphone image.

14. The audio processing method according to claim 13, wherein the mouth position of the user is a mouth position of the user in reality.

15. The audio processing method according to claim 13, wherein the mouth position of the user is a mouth position of the user in the virtual reality providing device.

16. The audio processing method according to claim 11, wherein the virtual sound collection position is obtained based on a portable device.

17. The audio processing method according to claim 11, wherein a microphone image is displayed in the virtual reality providing device based on a position of the portable device, the virtual sound collection position is obtained based on the microphone image of the virtual reality providing device, the first sound collection distance and the first sound collection angle are generated based on the virtual sound collection position and a mouth position of the user, and the adjusted first audio signal is generated based on the first sound collection distance and the first sound collection angle.

18. The audio processing method according to claim 17, wherein the mouth position of the user is a mouth position of the user in reality.

19. The audio processing method according to claim 17, wherein the mouth position of the user is a mouth position of the user in the virtual reality providing device.

* * * * *